US008310192B2

(12) United States Patent
Bonvin

(10) Patent No.: US 8,310,192 B2
(45) Date of Patent: Nov. 13, 2012

(54) REDUCING THE SPECTRAL ENERGY OF TORQUE RIPPLE

(75) Inventor: Frederic Bonvin, Longmont, CO (US)

(73) Assignee: STMicroelectronics, Inc., Coppell, TX (US)

(*) Notice: Subject to any disclaimer, the term of this patent is extended or adjusted under 35 U.S.C. 154(b) by 393 days.

(21) Appl. No.: 12/580,748

(22) Filed: Oct. 16, 2009

(65) Prior Publication Data

US 2010/0097717 A1  Apr. 22, 2010

Related U.S. Application Data

(60) Provisional application No. 61/106,108, filed on Oct. 16, 2008.

(51) Int. Cl.
*H02P 1/04* (2006.01)
*H02P 3/00* (2006.01)

(52) U.S. Cl. ............ 318/471; 318/254; 318/400.13; 318/400.35; 360/73.03

(58) Field of Classification Search .......... 318/560, 318/561, 268, 400.04, 400.08, 400.17, 400.01, 318/400.07, 400.12, 400.13, 400.32, 254, 318/471, 400.35; 360/75, 77.02, 78.04, 73.03
See application file for complete search history.

(56) References Cited

U.S. PATENT DOCUMENTS

| | | | | |
|---|---|---|---|---|
| 4,804,892 A * | 2/1989 | Muller | ............. | 318/400.17 |
| RE34,609 E * | 5/1994 | Mueller | ............. | 318/400.08 |
| 5,896,019 A * | 4/1999 | Nashiki et al. | ............. | 318/701 |
| 6,111,384 A * | 8/2000 | Stagnitto | ............. | 318/602 |
| 6,137,253 A * | 10/2000 | Galbiati et al. | ............. | 318/599 |
| 6,404,153 B2 * | 6/2002 | Gotou | ............. | 318/400.01 |
| 6,498,446 B1 * | 12/2002 | Menegoli et al. | ............. | 318/400.12 |
| 6,566,827 B2 * | 5/2003 | Gotou et al. | ............. | 318/400.07 |
| 6,600,287 B2 * | 7/2003 | Gotou | ............. | 318/599 |
| 6,639,372 B2 * | 10/2003 | Gotou | ............. | 318/400.32 |
| 6,754,031 B1 * | 6/2004 | Kisaka | ............. | 360/77.02 |
| 6,759,821 B2 * | 7/2004 | Gotou | ............. | 318/400.13 |
| 6,768,623 B1 | 7/2004 | Shen | | |
| 6,958,877 B2 * | 10/2005 | Gotou et al. | ............. | 360/73.03 |
| 6,960,928 B2 * | 11/2005 | Trifilo | ............. | 324/765.01 |
| 6,979,970 B2 * | 12/2005 | Iwanaga et al. | ............. | 318/400.35 |
| 6,995,537 B1 * | 2/2006 | Plutowski et al. | ............. | 318/400.04 |
| 7,092,197 B2 * | 8/2006 | El-Sherif et al. | ............. | 360/75 |
| 7,110,206 B2 * | 9/2006 | Gotou et al. | ............. | 360/73.03 |
| 2001/0002785 A1 * | 6/2001 | Gotou | ............. | 318/727 |
| 2002/0053890 A1 * | 5/2002 | Gotou et al. | ............. | 318/254 |
| 2002/0070696 A1 * | 6/2002 | Gotou | ............. | 318/254 |
| 2002/0117981 A1 * | 8/2002 | Gotou | ............. | 318/254 |
| 2003/0123178 A1 * | 7/2003 | Gotou et al. | ............. | 360/73.03 |
| 2003/0205976 A1 * | 11/2003 | Gotou | ............. | 318/254 |
| 2004/0222758 A1 * | 11/2004 | Tagome et al. | ............. | 318/268 |
| 2004/0263104 A1 * | 12/2004 | Iwanaga et al. | ............. | 318/439 |
| 2005/0110514 A1 * | 5/2005 | Trifilo | ............. | 324/772 |
| 2005/0264921 A1 * | 12/2005 | El-Sherif et al. | ............. | 360/78.04 |
| 2006/0023337 A1 * | 2/2006 | Gotou et al. | ............. | 360/73.03 |
| 2009/0058330 A1 * | 3/2009 | Boling et al. | ............. | 318/244 |

* cited by examiner

*Primary Examiner* — Paul Ip
(74) *Attorney, Agent, or Firm* — Graybeal Jackson LLP

(57) ABSTRACT

In BLDC motors driven via sensorless techniques, the BEMF signals in the motor coils may be used to detect the position of the motor such that speed of the motor may be accurately controlled. When detecting the BEMF signals, however, small perturbations occur which negatively impact the rotational torque of the motor. As a result, torque ripple may occur at regular intervals which may result in inefficiencies as well as audible noise. In various embodiments as described herein, the sampling of the BEMF signals may be done so at pseudorandom intervals such that the overall spectral energy that presents from the BEMF detections may be reduced at specific frequencies (such as fundamental sampling frequencies and harmonics thereof) and spread out over many more frequencies. Thus, despite the overall spectral energy being the same, the amplitude of any given frequency is lower as the sampling of the BEMF is less periodic.

24 Claims, 5 Drawing Sheets

REDUCING THE SPECTRAL ENERGY OF TORQUE RIPPLE

PRIORITY CLAIM TO PROVISIONAL PATENT APPLICATION

The present application claims the benefit of U.S. Provisional Patent Application No. 61/106,108 entitled 'SPREADING THE FREQUENCY SPECTRUM OF TORQUE RIPPLE IN A MOTOR' filed on Oct. 16, 2008, which application is incorporated herein by reference in its entirety.

BACKGROUND

A computer may use hard-disk drives (HDD) for storing data that is needed for operation of the computer. A typical HDD includes a magnetic read/write head and one or more magnetic disks for storing data. But for clarity, hereinafter a HDD is discussed as including only a single disk. Historically brushless DC motors (BLDG motor), such as three-phase brushless DC motors may be used for driving a HDD according to a method in which one of the coils is always floating while the other two coils are being driven with current. To rotate the disk at a constant torque, the shape of the driving wave forms are generally trapezoidal. However, it may be difficult to generate a trapezoidal waveform having a sharp "corner," and generating the driving waveforms with even a few degrees offset from their optimum phase relationship may introduce a significant amount of torque ripple in the rotating disk. Nowadays, BLDC motors are driven from signals that are derived from detecting the motor position based upon a measurement of a back electromotive force (BEMF) generated by the coils of the motor. As such, BLDC motors are designed to detect a sine-wave BEMF on each phase and then drive the BLDC motor by injecting sine-wave phase currents, resulting in constant torque (no ripple). Such detection of the motor position without Hall sensors (as has been used in the past) is referred to as a sensorless driving technique. With sensorless driving, however, a perturbation is introduced in each sine-wave phase current due to the manner in which the BEMF is detected resulting in a different torque ripple.

Torque ripple in a disk drive occurs when the torque applied to a rotating disk varies. For example, the disk torque may vary periodically, and may thus cause a vibration in the disk. That is, with a torque ripple, the disk does not rotate at a constant speed, but jitters, i.e., repeats a sequence of speeding up and slowing down. One reason to reduce or eliminate torque ripple in a disk drive is to ease the design tolerances of the circuits in the disk-drive controller and read channel. Another reason for reducing torque ripple is a reduction in acoustic noise generated by the HDD. Therefore, reduction in torque ripple in an operating HDD is desired.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

The following paragraph is a summary of a method and system for reducing torque ripple in a HDD system. In BLDC motors driven via sensorless techniques, the BEMF signals in the motor coils may be used to detect the position of the motor such that speed of the motor may be accurately controlled. When detecting the BEMF signals, however, small perturbations occur which negatively impact the rotational torque of the motor. As a result, torque ripple may occur at regular intervals which may result in inefficiencies as well as audible noise. In various embodiments as described herein, the sampling of the BEMF signals may be done so at pseudo-random intervals such that the overall spectral energy that presents from the BEMF detections may be reduced at specific frequencies (such as fundamental sampling frequencies and harmonics thereof) and spread out over many more frequencies. Thus, despite the overall spectral energy being the same, the amplitude of any given frequency is lower as the sampling of the BEMF is less periodic.

Figure 1:
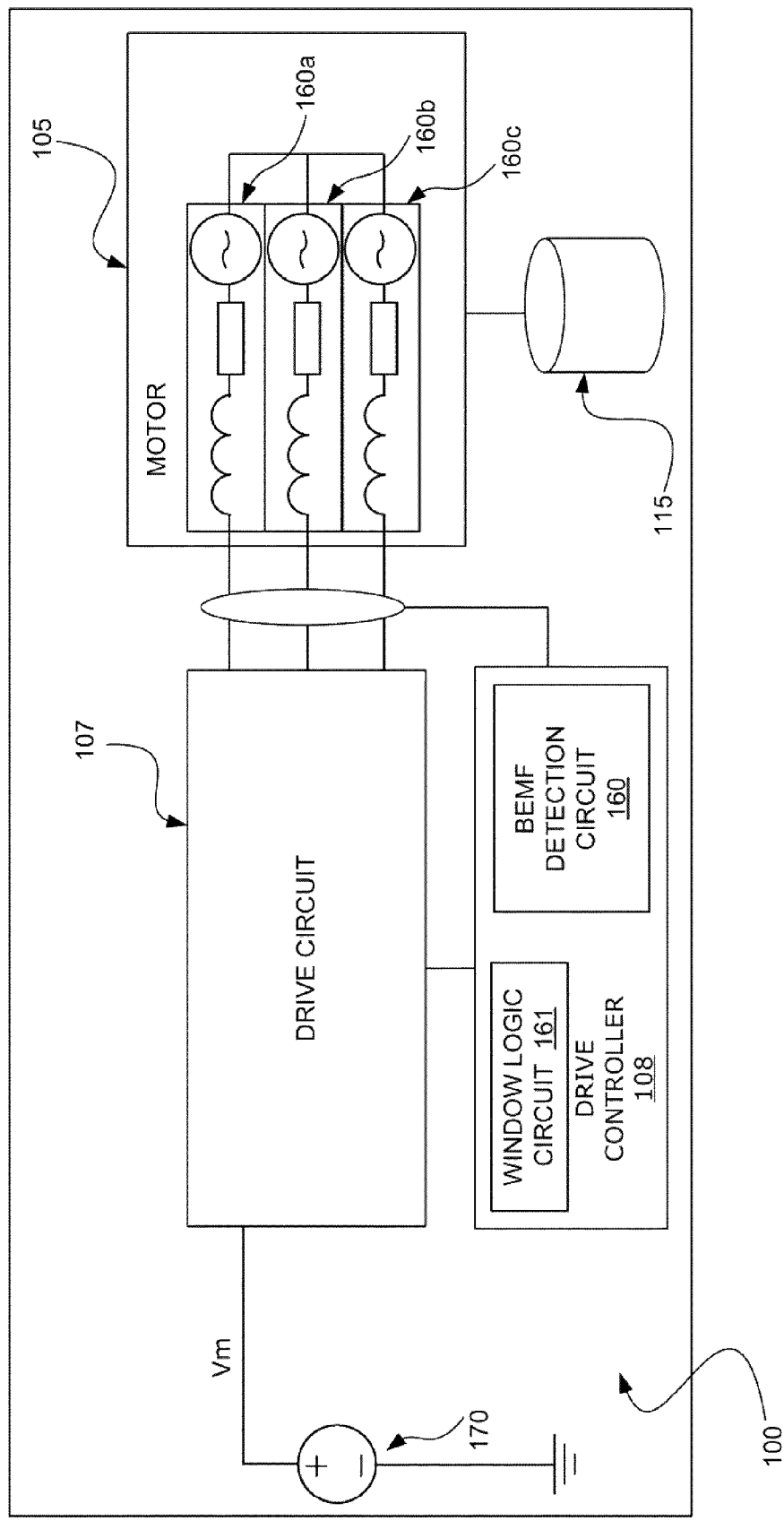
FIG. 1 is a block diagram of an embodiment of a HDD having a motor for driving a disk with reduced torque ripple by detecting BEMF in a pseudo-random sequence.

FIG. 1 is a block diagram of an embodiment of a HDD 100 having a motor 105 for driving a hard disk 115 with reduced torque ripple. Such a HDD 100 may include a brushless DC motor 105 having three phases 160a, 160b, and 160c. Each phase 160a, 160b, and 160c of the motor 105 may be driven by a dedicated phase drive signal from a drive circuit 107. Each drive signal may be a sinusoidal drive signal that may be generated from a voltage source 170 and controlled by a drive controller 108. Thus, each phase's sinusoidal drive signal is controlled by the drive controller 108 to adjust the speed of the motor 105 up or down according to what is needed at the time, e.g., faster or slower rotational speed.

Because the drive controller 108 controls the speed and rotation of the motor 105, the drive controller may use some means of determining the motor's orientation/position (e.g., the position of the rotor relative to the stator coils). Some motor designs may use Hall Effect sensors or a rotary encoder to directly measure the rotor's position. Other designs measure a back electromotive force (BEMF) by disconnecting the drive signal for a short duration of time in an undriven coil to infer the rotor position. This short duration of time is referred to as a "window" which is a small fraction of an electrical period. During operation (outside of the window), the coils of each phase are energized with phase drive signals which causes an electromagnetic field to develop about energized coils. The resulting attraction/repulsion between the electromagnetic field of energized coils and the magnetic fields created by magnets causes the motor 105 to rotate. While in the window, one of the three coils (that is not being commutated at the time) generates a BEMF signal that may be detected. This BEMF may be detected and used for speed control and timing control of the HDD 100. By detecting a zero-crossing of the sinusoidal BEMF of undriven coils, the need for separate Hall Effect sensors is eliminated, and therefore, such a design is often called sensorless drive controllers. This type of sensorless drive controller is described in greater detail in U.S. Pat. No. 5,969,491 which is assigned to the assignee of the present disclosure and is hereby incorporated by reference.

The drive controller 108 may include circuitry 160 for detecting BEMF signals from the motor phases. In conjunction with the detection of the BEMF signals, a window logic circuit 161 is coupled to the drive circuit 107 such that undriven coils may be opened up (e.g., a detection window of 10-30 degrees of the electrical period is created) Thus, the BEMF detection circuit 160 may determine an exact time of a zero-crossing of said BEMF signal. In this manner, the detected zero-crossings are indicative of the position of the motor and, therefore, the drive controller may adjust the drive signal for each phase according to a desired control algorithm. For example, the drive controller 108 may speed up or slow down the motor 105 based upon the detected positions according to a speed control algorithm or a data timing recovery algorithm.

The very measurement of the BEMF (e.g., disconnecting the drive signal to create the window), however, will cause a perturbation that works against the rotational energy of the motor 105 and thereby, introduces a torque in the opposite direction. It is this opposite torque force that causes a jitter in the rotational motion of the motor 105 and is referred to as torque ripple. There are a number of reasons why torque ripple is an undesirable component when driving a HDD 100.

As a first example, torque ripple induced jitter may affect the timing of the bits in a data stream being transferred to or from memory locations. As the storage density of the information in a HDD 100 increases, torque ripple can introduce unacceptable jitter into the system. For example, a servo feedback control loop (not shown) may be used to keep a read/write head centered over a track on a hard disk. Sometimes the hard disk suffers from what is called run-out, where the hard disk is not perfectly round. As a result, the servo feedback control loop constantly moves the read/write head back and forth in an effort to stay in line with the track. If the HDD 100 experiences torque ripple, then the servo feedback control loop must compensate for this as well, thus requiring the bandwidth of the servo feedback control loop to be high enough to track the torque-ripple frequencies. The relatively high bandwidth may decrease the stability and noise rejection of the servo feedback control loop.

As another example, a timing-recovery loop in a read/write channel may keep a data-sample clock (not shown) synchronized with the data being read from the disk. In acquisition mode, the timing-recovery loop synchronizes the data-sample clock to a preamble that is in a header at the beginning of a data sector on the hard disk. In tracking mode, the timing-recovery loop tracks the data-sample clock to the data transitions. So if the hard disk is experiencing torque ripple, i.e., fast and slow fluctuations in the rotational speed of the disk, the timing-recovery loop must have a bandwidth high enough to track this jitter. The relatively high bandwidth may decrease the stability and noise rejection of the timing-recovery loop.

Figure 2:
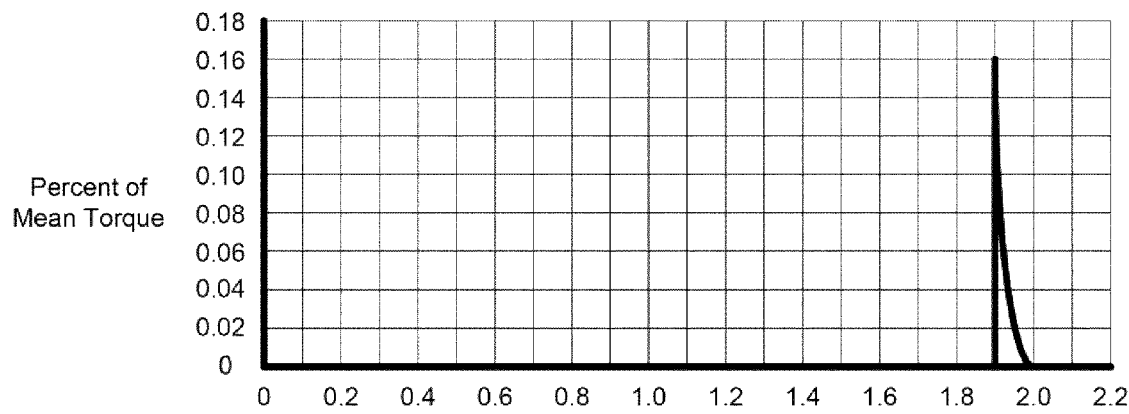
FIG. 2 is a time domain graph illustrating an embodiment of a method wherein one pulse of torque ripple is caused by a single sample of a BEMF on one coil of one phase of a motor.

Another reason that manufacturers may desire to reduce or eliminate torque ripple in a HDD 100 is to reduce the acoustic noise generated by the HDD. Because the torque ripple is typically periodic, it may produce vibrations at the fundamental ripple frequency and at one or more of the harmonics of the fundamental frequency, and at least one of these frequencies may be audible to human hearing. This may be particularly true if there are relatively few of these harmonics that are separated from one another in frequency, because this may allow the human ear to key in on at least one of these frequencies. And if one of these frequencies happens to be at or near a resonant frequency of a mechanical object or structure in the device, then this can excite that resonance and thus create even more of an audible noise. Furthermore, the periodic nature of the perturbations may cause audible noise because of the fundamental frequency of the periodic perturbations and harmonics thereof Therefore, the reduction or elimination of torque ripple is desired for many reasons. FIGS. 2-12 illustrate several methods of detecting BEMF signals so as to reduce torque ripple in the HDD 100 by disrupting the periodicity of the perturbations that are induced by the BEMF measurement FIG. 2 shows a plot of a simplistic torque-ripple amplitude where there is a zero crossing detected and thus a perturbation caused at the same relative time of each electrical period. Generally speaking, a BEMF signal on a phase is generated when the phase's pole moves past a coil. As a result, a periodic sinusoidal BEMF signal is generated because of the rotational nature of the motor. The resulting overall BEMF is then sinusoidal such that the zero-crossings of the sine wave indicate that the poles and the coils are aligned at a time corresponding to the period of the sine wave. Thus, by detecting the zero crossings of the BEMF signal, one can calculate the position of the rotor and, consequently, adjust control accordingly. And the zero-crossing signal may not only be used to synchronize the drive waveforms to the position of the motor/disk (i.e., to commutate the drive waveforms), but may also be used by the drive controller to sense the speed of the hard disk and so that the controller can maintain the rotational speed of the hard disk relatively constant, for example, at 7200 RPM. To perform this speed control, the drive controller may require samples of every zero crossing of every phase.

When detecting the BEMF signal, one of the coils not being driven at that moment in time may be "opened" for a small window of time about an anticipated zero crossing of the BEMF of that coil. That is, during a time when a particular phase is not being driven, the drive controller may disconnect the phase from a drive signal connection and monitor the phase for BEMF for a short duration of time, e.g., a time corresponding to 10 to 30 degrees of an electrical period. Therefore, the zero crossing can be detected during this window, and the drive controller waveforms can be synchronized to this zero crossing.

But a problem with opening such a window is that it introduces torque ripple into the rotation of the disk. As seen in FIG. 2, when a BEMF signal is detected (at an arbitrary time of $1.9 \times 10^{-3}$ seconds in this example, (once per electrical period for a HDD running at 7200 rpm with 4 pair poles motor), a torque ripple 200, is generated. This torque ripple has a force of 16% of the mean torque that is rotating the disk during a very short time. As more and more samples of the BEMF signals are taken, the above-described problems begin to manifest.

Figure 3:
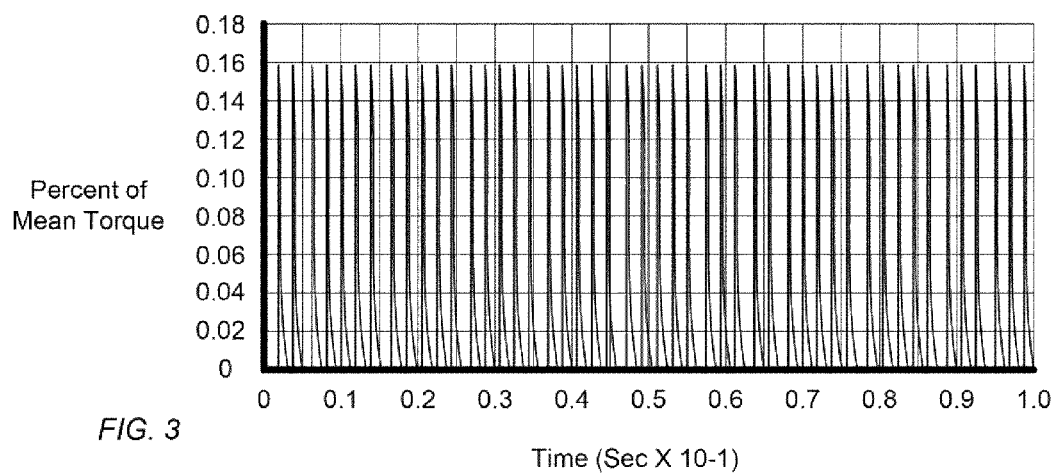
FIG. 3 is a time domain graph of torque ripple illustrating an embodiment of a method wherein a BEMF is sampled every electrical period for one phase of a motor.

FIG. 3 shows the same phenomenon as FIG. 2 but at a larger time scale wherein a BEMF signal is sampled every electrical period for one phase of a motor. When one analyzes the BEMF signals of a three-phase motor, one electrical period may be defined as the period of time between each zero-crossing of all three phases' BEMF signals. For example, looking only at one phase for a motor with eight poles (a four pair-pole motor), there are four electrical cycles per one revolution of the motor (which is usually called a mechanical revolution and discussed further below). So within each electrical period, considering there are three phases, there are a possible six zero crossings, two for each BEMF sine wave wherein each sine wave is offset from the others by 120 degrees. Therefore, when there are six possible perturbations per electrical period that may be sampled.

In the method illustrated in FIG. 3, one of these six possible perturbations is sampled. In this embodiment, the sample is taken on the same phase on the same pole for each electrical period. Thus, each perturbation is periodic and exhibits an amplitude equivalent to about 16% of the mean torque that is driving the motor. As a result, the perturbations occur with relatively stable frequency and, therefore, will cause audible torque ripple at a fundamental frequency and harmonics thereof. The effects of this torque ripple are illustrated in FIG. 4.

Figure 4:
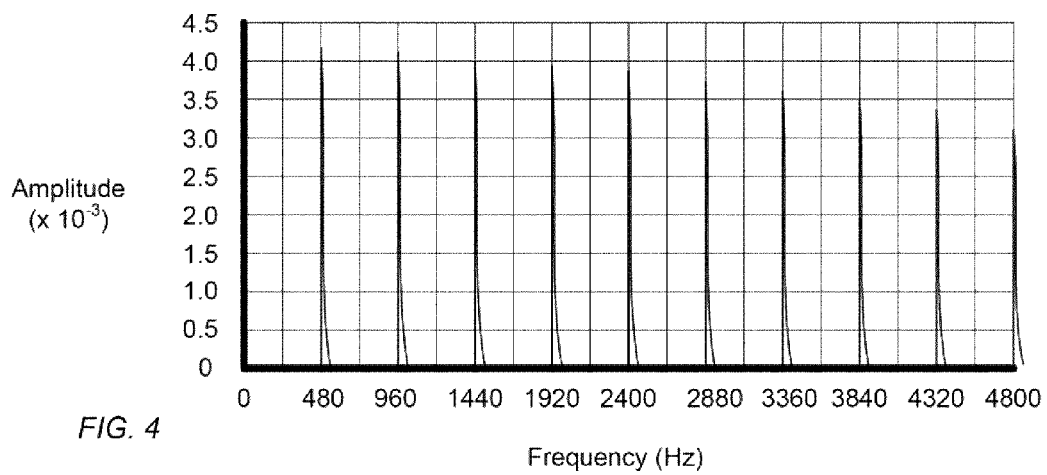
FIG. 4 is a frequency domain graph illustrating an embodiment of a method wherein the Fourier transform of the graph of FIG. 3 is shown.

FIG. 4 is a frequency domain graph illustrating the Fourier transform of the time domain graph of FIG. 3 is shown. Because the torque-ripple perturbations are effectively pulses that occur periodically as seen in FIG. 3, the Fourier Transform of these pulses may be an infinite sum of the fundamental ripple frequency and the harmonics thereof. Thus, if one assumes that a typical HDD will spin at 7200 RPMs, this is equivalent to 120 rotations per second. Further, with four electrical periods per rotation, 120 rotations multiplied by four electrical periods results in 480 torque-ripple perturbations every second. Therefore, the fundamental torque-ripple frequency when sampling once every electrical period is 480 Hz. So the spectral energy exhibited (as shown in FIG. 4) is at 480 Hz (fundamental frequency or first harmonic), 960 Hz (second harmonic), 1440 Hz (third harmonic), 1920 Hz (fourth harmonic), etc. At least the fundamental frequency and some of the significant harmonics fall into the audible hearing range, which, even in older people, may extend up to 15,000 Hz or more. Thus, sampling the BEMF signal at every electrical period may result in an undesirable level of torque ripple.

Sometimes the motor poles in the motor are not perfectly located relative to one another. That is, the poles may not be exactly in the physical locations that correspond to 90 electrical degrees apart for a four-pair-pole motor. Therefore, the zero-crossings sampled from one coil/phase may not be the ideal sample to commutate another one of the coils/phases.

One way to alleviate this problem is to sample only one phase once per mechanical period using the same coil and the same zero crossing. In this manner, the same zero-crossing is consistently sampled, and any error relative to the other poles is consistent. This error, however, may be more problematic when zero-crossing samples are being used for speed control as well as for commutation from different phases and different poles, because the zero-crossing sample may drift because the poles are not positioned at exactly 90 degrees. This may introduce an error into the speed measurement, and thus into the disk rotational speed. The sampling of the BEMF on every mechanical revolution is shown in FIGS. 5 and 6 as discussed further in the next paragraphs.

Figure 5:
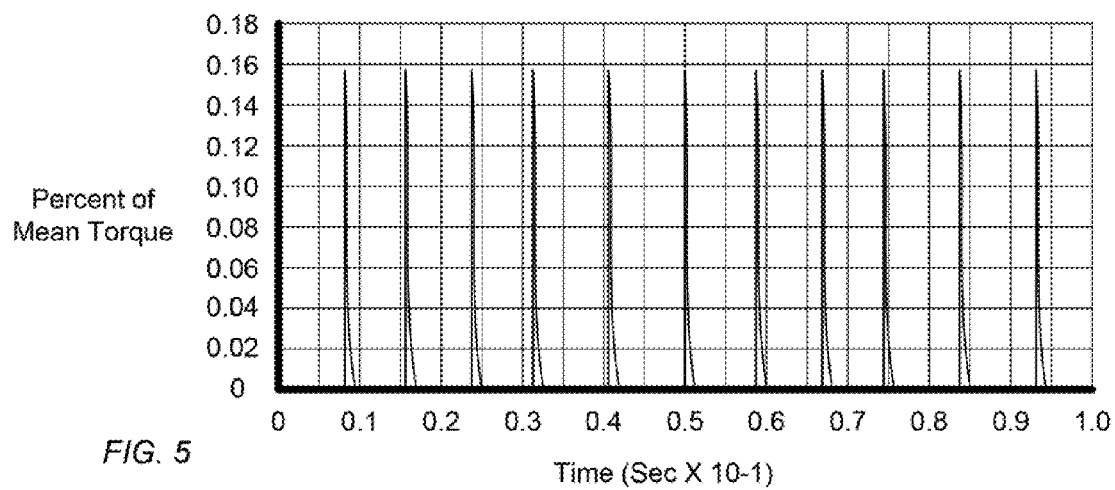
FIG. 5 is a time domain graph illustrating an embodiment of a method wherein a BEMF is sampled every mechanical period for one phase of a motor.

FIG. 5 is a time domain graph illustrating an embodiment of a method wherein a BEMF is sampled every mechanical period for one phase of a motor. Some drive controllers are capable of reading servo loop control data from on the HDD itself to monitor and control the speed of the disk. So in this situation, it may be practical to sample the zero crossing only once per mechanical revolution of the disk as opposed to one or more times every electrical period of the disk. This is because the zero-crossings do not need to be detected for speed control, but rather just timing-recovery loops and other data-related control reasons. As briefly mentioned above then, one mechanical period (i.e., the time it takes for the disk to rotate once) of the disk is equivalent to four electrical periods (in a four-pair pole motor). As can be seen then in FIG. 5, only every fourth BEMF-induced perturbation is sampled (as compared to FIG. 3). Consequently, the frequency of the perturbations is less, about 120 Hz as can be seen in FIG. 6.

Figure 6:
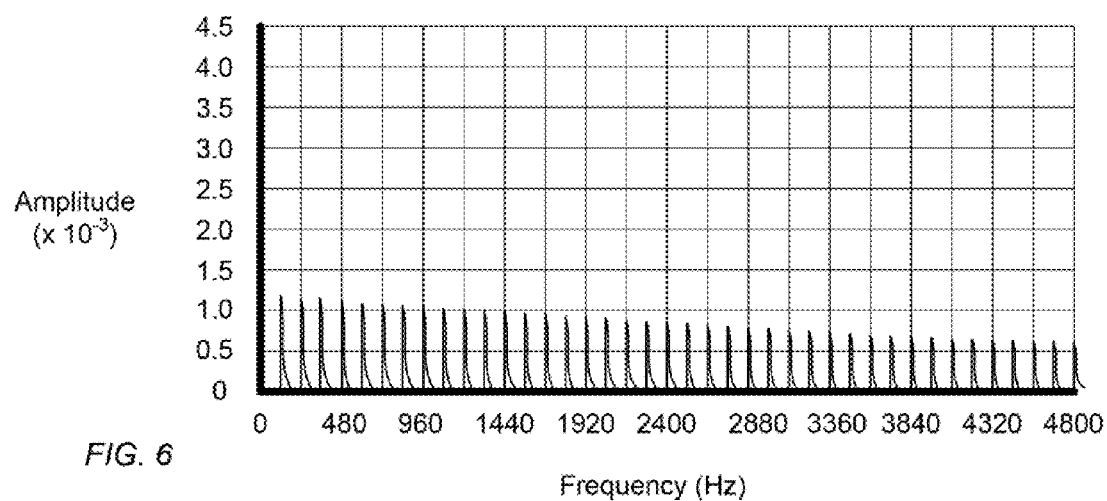
FIG. 6 is a frequency domain graph illustrating an embodiment of a method wherein the Fourier transform of the graph of FIG. 5 is shown.

FIG. 6 is a frequency domain graph illustrating an embodiment of a method wherein the Fourier transform of the time domain graph of FIG. 5 is shown. Sampling once every mechanical period results in spectral energy at the fundamental frequency of 120 Hz and its harmonics. Comparing this to the case where the zero crossing is taken every electrical period, the frequencies are closer together, so the spectral energy is spread out over more frequencies within the audible range, and so it is less likely that there is enough energy at any one of these frequencies to cause audible noise, although an audible noise may still result. Further, the human ear will also have more difficulty to differentiate those peaks and will interpret such noise as background noise. This type of noise is by far less annoying to people. Furthermore, because the number of torque perturbations is four times lower, the total perturbation energy is also reduced by a factor of four.

The sampling of BEMF signals may be spread out even further is what is referred to as a super mechanical mode. In this method, sampling a zero-crossing less than once per mechanical revolution is implemented. This can be done without causing as many perturbation problems, particularly if the circuitry that regulates the disk speed does not use zero-crossing samples to do so. This may be the case because the precision needed to commutate the motor 105 is lower than the precision needed for the motor speed controller.

As but one example, a drive controller may sample a BEMF zero-crossing once every four revolutions of the disk to further reduce the total torque ripple energy and spread the spectral energy even further within the audible range. In this example, the disk controller may estimate the occurrence of the BEMF zero-crossing to be sampled within 0.8%, which is 2.88° of an electrical period. If the sampling window is, for example, 30° of an electrical period, then the window is large enough to accommodate the possible estimation error. Sampling the BEMF zero-crossing once every four disk revolutions reduces the torque perturbation energy by a factor of four compared to the regular mechanical mode where one zero-crossing sample is taken per disk revolution, and by a factor of sixteen compared to one sampling one zero crossing per electrical period.

If one were to graph this in the frequency domain, the zero-crossing sampling rate, and thus the torque-perturbation frequency, would manifest at approximately 30 Hz, so the Fourier frequencies are spaced 30 Hz apart, which spreads the acoustic energy even more within the audible range, and thus lowers even more the chances that sound at any of these frequencies will be audible or excite an audible resonance in the disk drive. Such a solution is suitable when numerous samplings are not required for motor speed control. When more samplings are required a different solution as discussed below may be implemented.

Generally, one can randomize or pseudo-randomize the timing of when the zero crossings are detected, and thus can randomize or pseudo-randomize the occurrences of the torque ripple to spread the vibration energy over more frequencies, particularly over more frequencies within the audible portion of the frequency spectrum. The more frequencies over which one spreads the energy, the more the noise tends to resemble white noise and blend into the background so as not make audible noise. The following paragraphs describe embodiments of methods wherein the BEMF samples are more random than the previous embodiments.

Figure 7:
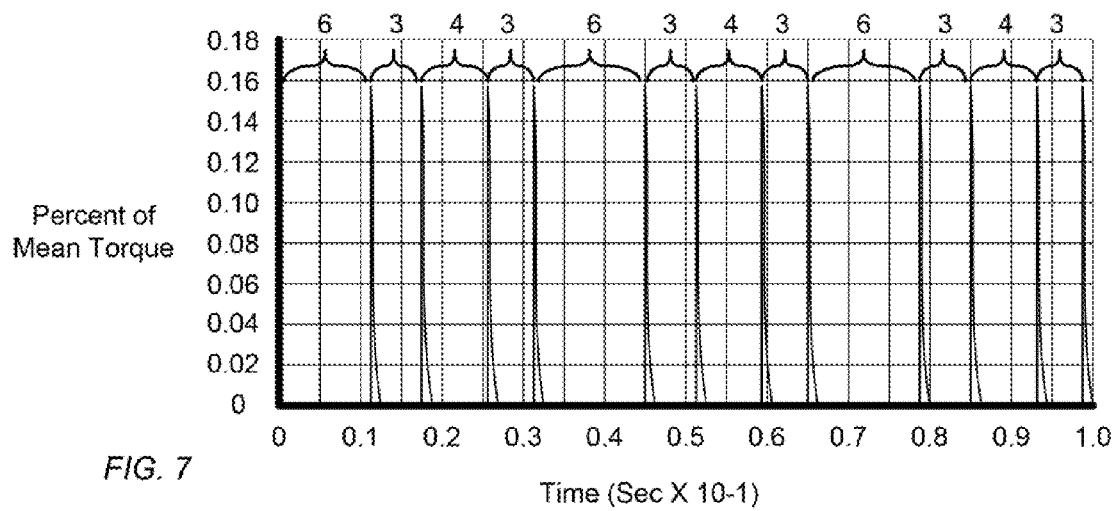
FIG. 7 is a time domain graph illustrating an embodiment of a method wherein a BEMF is sampled according to a first pseudo-random sequence for one phase of a motor.
Figure 8:
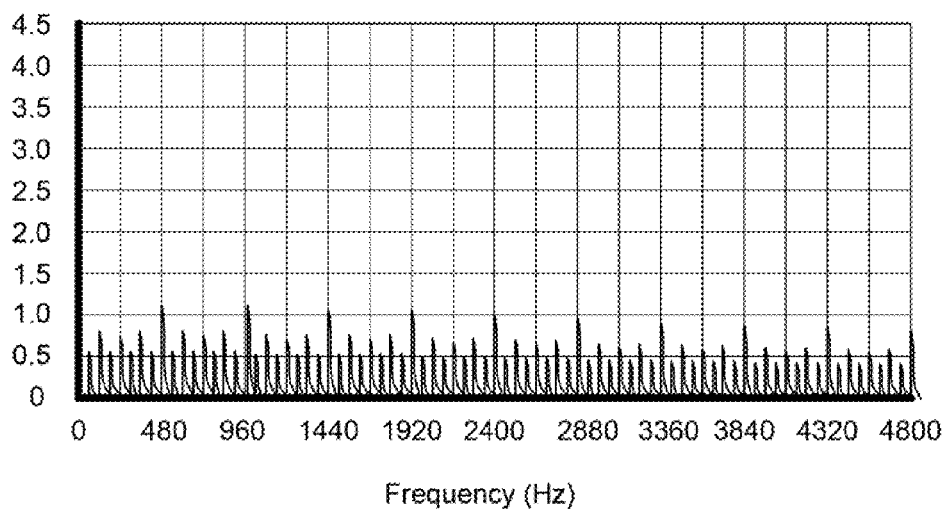
FIG. 8 is a frequency domain graph illustrating an embodiment of a method wherein the Fourier transform of the graph of FIG. 7 is shown.

FIG. 7 is a graph illustrating an embodiment of a method wherein a BEMF is sampled according to a first pseudo-random sequence for one phase of a motor. In this method, samples are taken at non-periodic intervals of the electrical periods of the phase. Thus, the first zero-crossing sample is taken after six electrical periods, the next sample three electrical periods later, and then the next sample four electrical periods later, the next sample three electrical periods later. This 6-3-4-3 sequence then repeats wherein BEMF samples are taken at these pseudo-random points that correspond to one of the zero-crossings for an electrical period of one phase of the motor. As can be seen in FIG. 8, the spectral energy is spread out even further as compared to previous embodiments.

FIG. 8 is a frequency domain graph illustrating an embodiment of a method wherein the Fourier transform of the time domain graph of FIG. 7 is shown. In comparison to the first embodiment (sampling every electrical period as illustrated in FIG. 4) where the fundamental frequency is 480 Hz, and to the second example (sampling every $4^{th}$ electrical period as illustrated in FIG. 6) where the fundamental frequency is 120 Hz, this embodiment does not exhibit as much spectral energy focused on fundamental frequencies or harmonics thereof. In this embodiment, the pattern repeats every $16^{th}$ electrical period, and therefore, the spectral energy is spread over even more frequencies at lower amplitudes, thus further reducing the chances that the torque ripple will generate audible noise.

Figure 9:
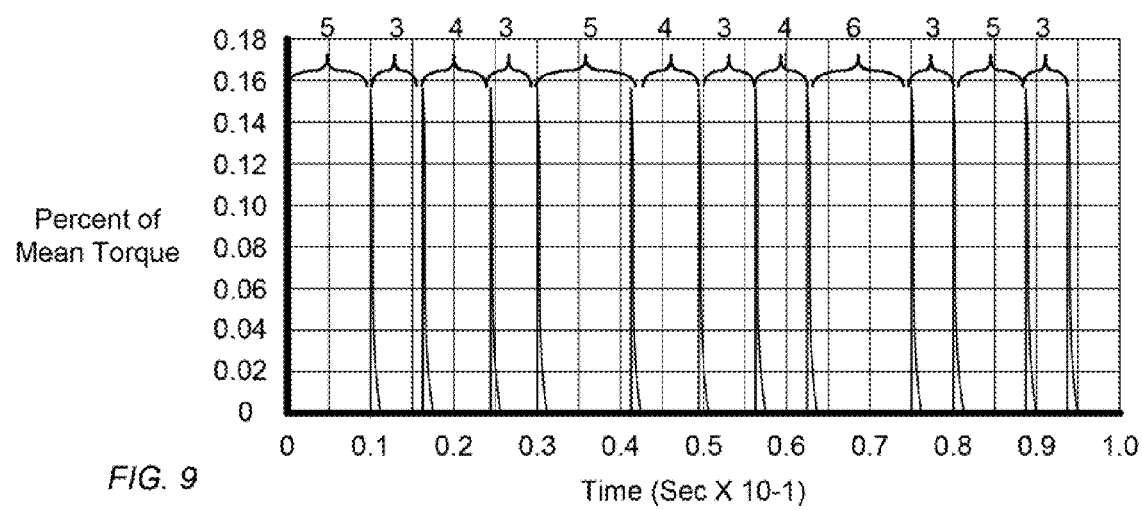
FIG. 9 is a time domain graph illustrating an embodiment of a method wherein a BEMF is sampled according to a second pseudo-random sequence for one phase of a motor.
Figure 10:
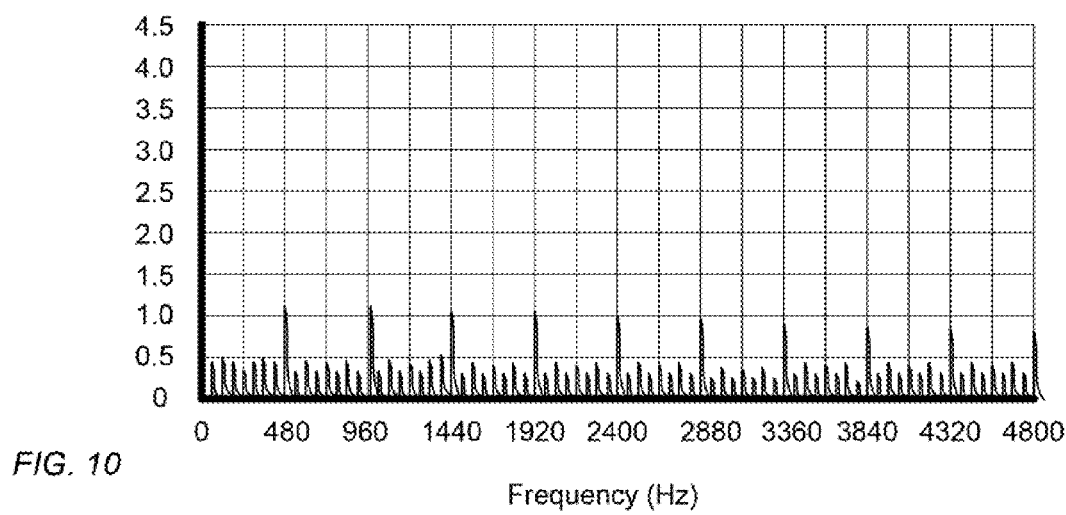
FIG. 10 is a frequency domain graph illustrating an embodiment of a method wherein the Fourier transform of the graph of FIG. 9 is shown.

FIG. 9 is a time domain graph illustrating an embodiment of a method wherein a BEMF is sampled according to a second pseudo-random sequence for one phase of a motor. In this method, samples are again taken at non-periodic intervals of the electrical periods of the phase. However, in this embodiment, the first zero-crossing sample is taken after five electrical periods, the next sample three electrical periods later, and then the next sample four electrical periods later, the next sample three electrical periods later. The sequence continues with varying intervals of three, four, five, or six electrical periods. Thus, the overall sequence is 5-3-4-3-5-4-3-4-6-3-5-3 over 12 samples. This sequence then also repeats wherein BEMF samples are taken at these pseudo-random points that correspond to one of the zero-crossings for an electrical period of one phase of the motor. As can be seen in FIG. 10, the spectral energy is again spread out further as compared to the more periodic embodiments.

FIG. 10 is a frequency domain graph illustrating an embodiment of a method wherein the Fourier transform of the time domain graph of FIG. 9 is shown. In this embodiment, the pattern repeats every $48^{th}$ electrical period, and therefore, the spectral energy is again spread over more frequencies at lower amplitudes, thus further reducing the chances that the torque ripple will generate audible noise.

Figure 11:
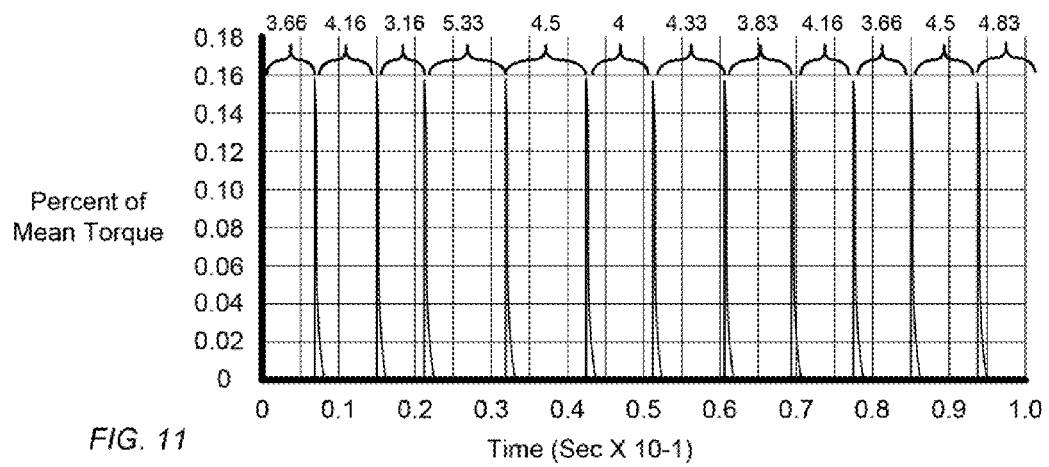
FIG. 11 is a time domain graph illustrating an embodiment of a method wherein a BEMF is sampled according to a first pseudo-random sequence for different phases of a motor.

FIG. 11 is a graph illustrating an embodiment of a method wherein a BEMF is sampled according to a pseudo-random sequence involving different phases of a motor. In this embodiment, sometimes referred to as super spread spectrum mode, BEMF samples are taken not only at a pseudo-random sequence of different electrical periods, but also on different phases of the three-phase motor. As briefly discussed above, for each electrical period there are three phase-shifted sine waves, for a total of six zero crossings that can be detected per electrical period. This means that for each mechanical revolution of the disk (assuming a 4-pair-pole motor), there are four electrical periods times six zero crossing equals twenty four zero crossings that can be detected per each revolution of the disk.

So in the above-described embodiments of FIGS. 3-10 where no more than one zero-crossing sample is taken per electrical period, the sample may be always taken at the same zero-crossing on the same motor phase. In this embodiment however, additional randomness may be achieved by sampling other motor phases as well. Thus, one can utilize multiple ones of the six available zero crossings. For example, all six zero crossings may be sampled, or three, or two, etc., and the same zero crossings need not be sampled every electrical period. So, this allows a pseudo-random sequence with a lower frequency to further spread out the spectral energy without reducing the sampling rate to unacceptable levels.

FIG. 11 shows a pseudo-random sequence of sampling at electrical period intervals of 3.66-4.16-3.16-5.33-4.5-4-4.33-3.83-4.16-3.66-4.5-4.83. Using this nomenclature, the decimal numbers, such as 3.66, 4.16, and 3.16 indicate sampling from one of the six zero-crossings within one electrical period that are evenly spaced ⅙ of an electrical period apart. Thus, each of the six zero-crossings is ⅙ of a period apart from each other or 0.16 of a period. For example, 3.66 indicates taking a sample after 3⅔ electrical periods. As a result, an even greater reduction in torque ripple is achieved because the BEMF perturbations are sampled with even more random intervals. This can be seen in FIG. 12.

Figure 12:
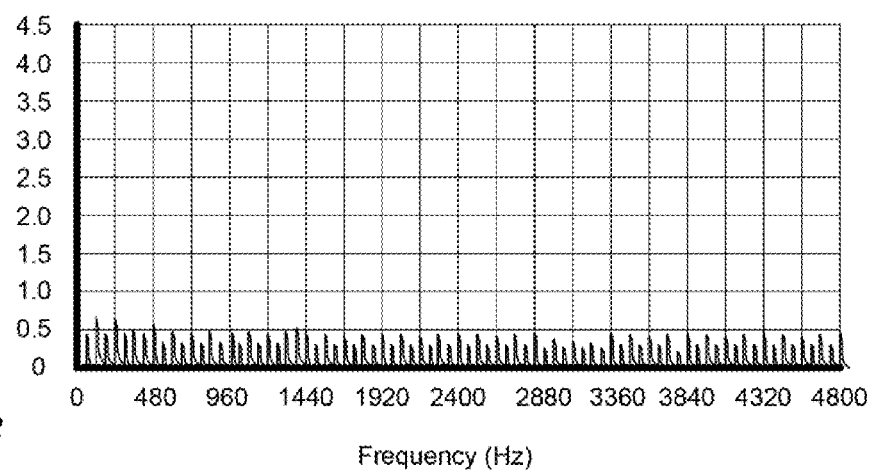
FIG. 12 is a frequency domain graph illustrating an embodiment of a method wherein the Fourier transform of the graph of FIG. 11 is shown.

FIG. 12 is a frequency domain graph illustrating an embodiment of a method wherein the Fourier transform of the time domain graph of FIG. 11 is shown. As can be seen, the spectral energy is greatly spread out as there are no frequencies that exhibit relatively higher amplitudes.

Figure 13:
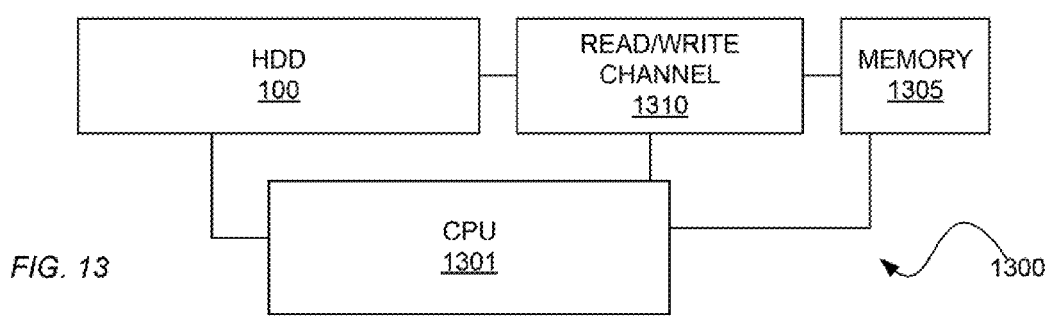
FIG. 13 is a block diagram of an embodiment of a system having an HDD of FIG. 1.

FIG. 13 is a block diagram of an embodiment of a system 1300 having an HDD 100 of FIG. 1. In FIG. 13, the HDD 100 of FIG. 1 is coupled to a CPU 1301 that may control the HDD 100 directly as well as a read/write channel 1310 that is also coupled to the CPU 1301. Thus, the CPU 1301 may control the HDD 100 to read data from or write data to a memory 1305. Further, the CPU 1301 may have a fan 1315 that may be controlled via a motor (not shown). The above-described embodiments may be used for motors (e.g., fan motors) other than disk-drive motors. Furthermore, these embodiments may be implemented in hardware, software, or firmware, or a combination or sub-combination of hardware, software, and firmware.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A method of controlling torque ripple in a disk drive comprising:
   detecting a position of a motor at a first time interval and a second time interval by detecting back EMF signals in motor coils at pseudo-random time intervals to detect the motor position, such that the overall spectral energy that presents from the back EMF detections may be reduced at specific frequency and spread out over many more frequencies; and
   driving the motor in response to the detected positions to control the torque ripple of the motor.

2. The method of claim 1, wherein driving the motor further comprises adjusting the speed of the motor based upon the detected positions.

3. The method of claim 1, wherein driving the motor further comprises adjusting timing of a read/write channel of a hard disk drive coupled to the motor based upon the detected positions.

4. The method of claim 1 wherein the time intervals comprises a sequence of:
   detecting a first position after six electrical periods of one coil;
   detecting a second position after the next three electrical periods of the one coil;
   detecting a third position after the next four electrical periods of the one coil; and
   detecting a fourth position after the next three electrical periods of the one coil.

5. The method of claim 4, further comprising repeating the sequence.

6. The method of claim 1 wherein the time intervals comprises a sequence of:
   detecting a first position after five electrical periods of one coil;
   detecting a second position after the next three electrical periods of the one coil;
   detecting a third position after the next four electrical periods of the one coil;
   detecting a fourth position after the next three electrical periods of the one coil
   detecting a fifth position after five electrical periods of one coil;
   detecting a sixth position after the next three electrical periods of the one coil;
   detecting a seventh position after the next four electrical periods of the one coil;
   detecting an eighth position after the next three electrical periods of the one coil,
   detecting a ninth position after six electrical periods of one coil;
   detecting a tenth position after the next five electrical periods of the one coil;
   detecting an eleventh position after the next three electrical periods of the one coil; and
   detecting a twelfth position after the next four electrical periods of the one coil.

7. The method of claim 6, further comprising repeating the sequence.

8. The method of claim 1 wherein the time intervals comprises a sequence of:
   detecting a first position of a first coil; and
   detecting a second position of a second coil,
   detecting additional position of any one of first, second and third coils.

9. A method of controlling torque ripple in a disk drive comprising:
   detecting a position of a motor at a first time and a second time wherein the second time occurs after an interval corresponding to at least two revolutions of the motor after the first time by detecting the signals in motor coil coils at pseudo-random time intervals to detect the motor position; and
   driving the motor in response to the detected positions to control the torque ripple of the motor.

10. The method of claim 9, wherein the interval corresponds to four revolutions of the motor.

11. A drive controller for driving a motor, the drive controller comprising:
    at least one drive circuit operable to couple at least one drive signal to a motor;
    a BEMF detection circuit operable to detect the position of the motor based upon one or more BEMF signals in one or more coils of a motor, the position of the motor detected at a pseudo-random sequence of time intervals; and
    a logic circuit operable to control the drive circuit based upon the detected position.

12. The drive controller of claim 11, further comprising at least three drive signal interfaces operable to couple to a respective phase of a three-phase motor.

13. The drive controller of claim 11, wherein the pseudo-random sequence of intervals comprises:
    a first interval of six electrical periods of one coil;
    a second interval of three electrical periods of the one coil;
    a third interval of four electrical periods of the one coil; and
    a fourth interval of three electrical periods of the one coil.

14. The drive controller of claim 11, wherein the pseudo-random sequence of intervals comprises:
    a first interval of five electrical periods of one coil;
    a second interval of three electrical periods of the one coil;
    a third interval of four electrical periods of the one coil;
    a fourth interval of three electrical periods of the one coil
    a fifth interval of five electrical periods of one coil;
    a sixth interval of three electrical periods of the one coil;
    a seventh interval of four electrical periods of the one coil;
    an eighth interval of three electrical periods of the one coil,
    a ninth interval of six electrical periods of one coil;
    a tenth interval of three electrical periods of the one coil;
    an eleventh interval of five electrical periods of the one coil; and
    a twelfth interval of three electrical periods of the one coil.

15. The drive controller of claim 11, wherein the pseudo-random sequence of intervals comprises:
    a first interval corresponding to a time between a first zero-crossing of a BEMF signal of a first coil and a zero-crossing of a BEMF signal of a second coil; and
    a second interval corresponding to a time between the zero-crossing of a BEMF signal of the second coil and a second zero-crossing of the first coil; and additional intervals corresponding to times between zero-crossings of BEMF signals in of any one of first, second and third coils.

16. The drive controller of claim 15, wherein:
the first interval corresponds to 3.16 electrical periods; and
the second interval corresponds to 4.16 electrical periods.

17. The drive controller of claim 16, further comprising:
a third interval corresponding to 3.16 electrical periods;
a fourth interval corresponding to 5.33 electrical periods;
a fifth interval corresponding to 4.5 electrical periods;
a sixth interval corresponding to 4.0 electrical periods;
a seventh interval corresponding to 4.33 electrical periods;
an eighth interval corresponding to 3.83 electrical periods;
a ninth interval corresponding to 4.16 electrical periods;
a tenth interval corresponding to 3.66 electrical periods;
an eleventh interval corresponding to 4.5 electrical periods; and
a twelfth interval corresponding to 4.83 electrical periods.

18. A hard disk drive, comprising:
a storage medium;
a motor coupled to the storage medium operable to rotate the storage medium when driven; and
a drive controller for driving the motor, the drive controller comprising:
at least one drive circuit operable to couple at least one drive signal to a motor;
a BEMF detection circuit operable to detect the position of the motor based upon one or more BEMF signals in one or more coils of a motor, the position of the motor detected at a pseudo-random sequence of time intervals; and
a logic circuit operable to control the drive circuit based upon the detected position.

19. The hard disk drive of claim 18, further comprising a read/write channel coupled to the hard disk and operable to read data from and write data to the hard disk.

20. A system, comprising:
a processor;
a memory coupled to the processor;
a read/write channel coupled to the processor and coupled to the memory; and
a hard disk drive coupled to the read/write channel and coupled to the processor, comprising:
a storage medium;
a motor coupled to the storage medium operable to rotate the storage medium when driven; and
a drive controller for driving the motor under the direction of the processor, the drive controller comprising:
at least one drive circuit operable to couple at least one drive signal to a motor;
a BEMF detection circuit operable to detect the position of the motor based upon one or more BEMF signals in one or more coils of a motor, the position of the motor detected at a pseudo-random sequence of time intervals; and
a logic circuit operable to control the drive circuit based upon the detected position.

21. A method for driving a motor, the method comprising:
detecting a position of a motor at a pseudo-random sequence of time intervals; and
driving the motor in response to the detected positions.

22. The method of claim 21, wherein the pseudo-random sequence of time intervals corresponds to different integer quantities of electrical periods of one coil of the motor.

23. The method of claim 21, wherein the pseudo-random sequence of time intervals corresponds to different non-integer quantities of electrical periods of one or more coils of the motor.

24. The method of claim 21, wherein the pseudo-random sequence of time intervals corresponds to different integer quantities of mechanical periods of the motor.

* * * * *